March 2, 1948. P. H. FASSNACHT 2,436,960
APPARATUS FOR MILLING
Filed June 17, 1943 9 Sheets-Sheet 1
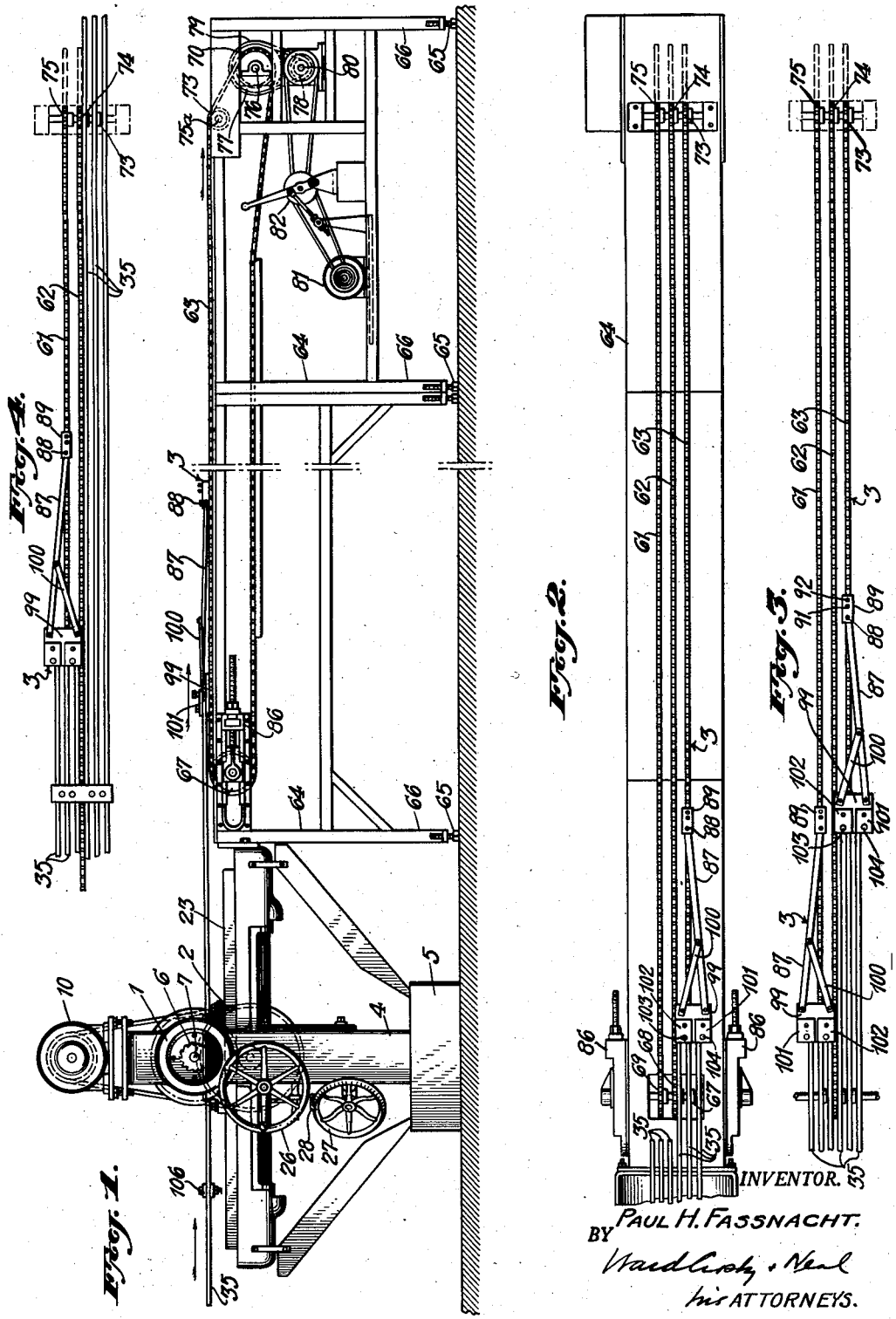
INVENTOR.
PAUL H. FASSNACHT.
BY Ward Crosby Neal
his ATTORNEYS.

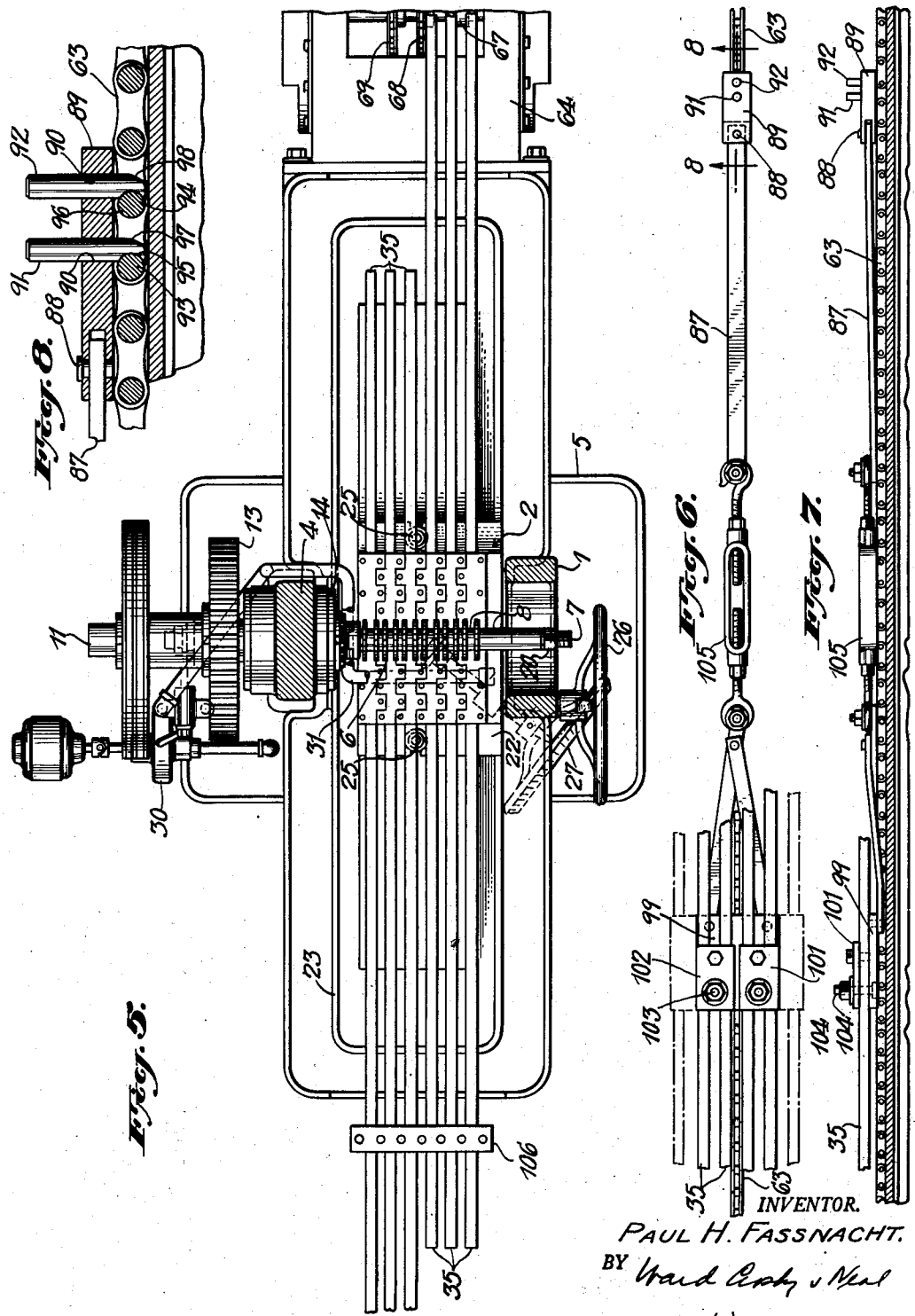

March 2, 1948. P. H. FASSNACHT 2,436,960
APPARATUS FOR MILLING
Filed June 17, 1943 9 Sheets-Sheet 3

INVENTOR.
PAUL H. FASSNACHT.
BY
his ATTORNEYS.

March 2, 1948.  P. H. FASSNACHT  2,436,960
APPARATUS FOR MILLING
Filed June 17, 1943  9 Sheets-Sheet 4
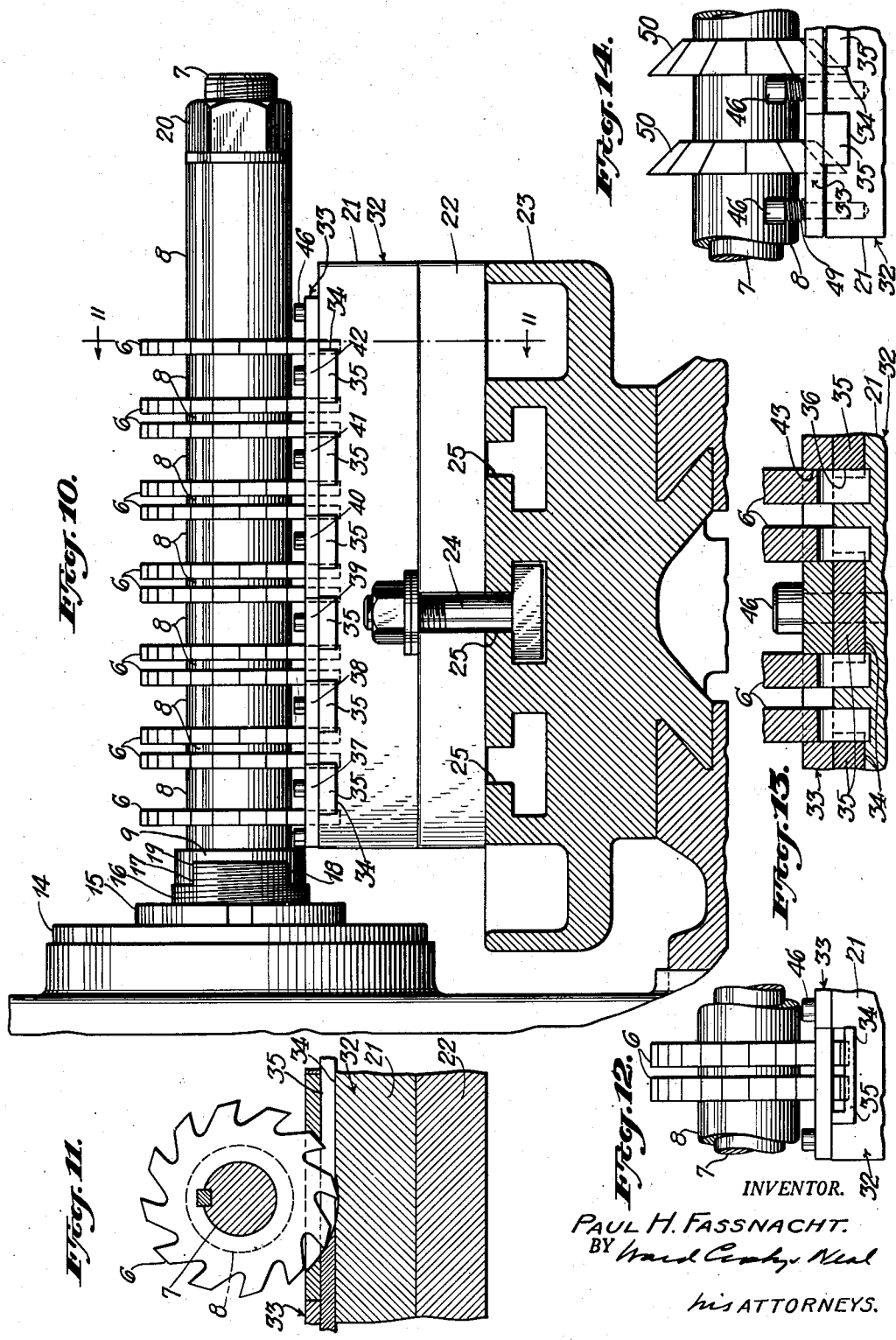
INVENTOR.
PAUL H. FASSNACHT.
BY
his ATTORNEYS.

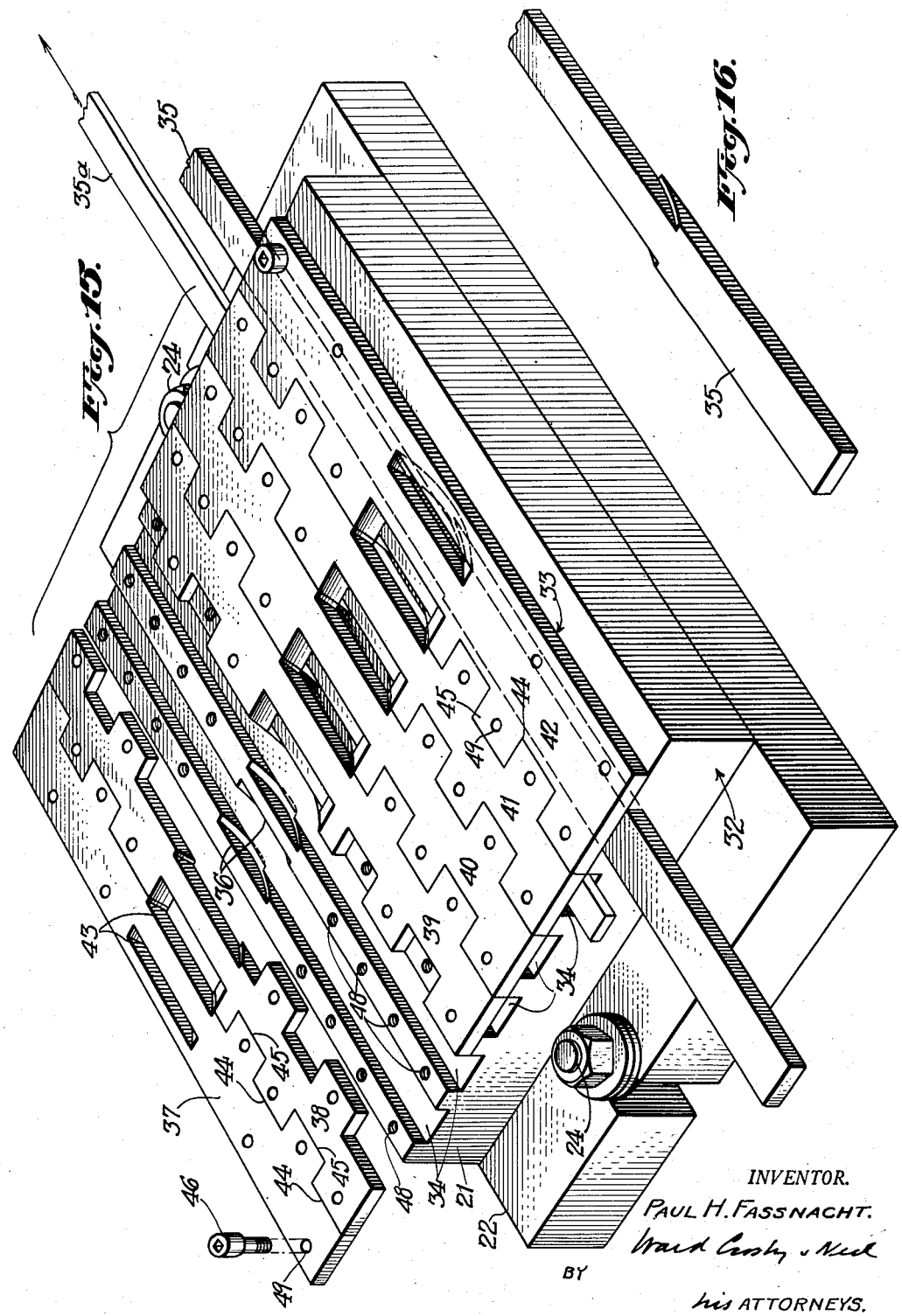

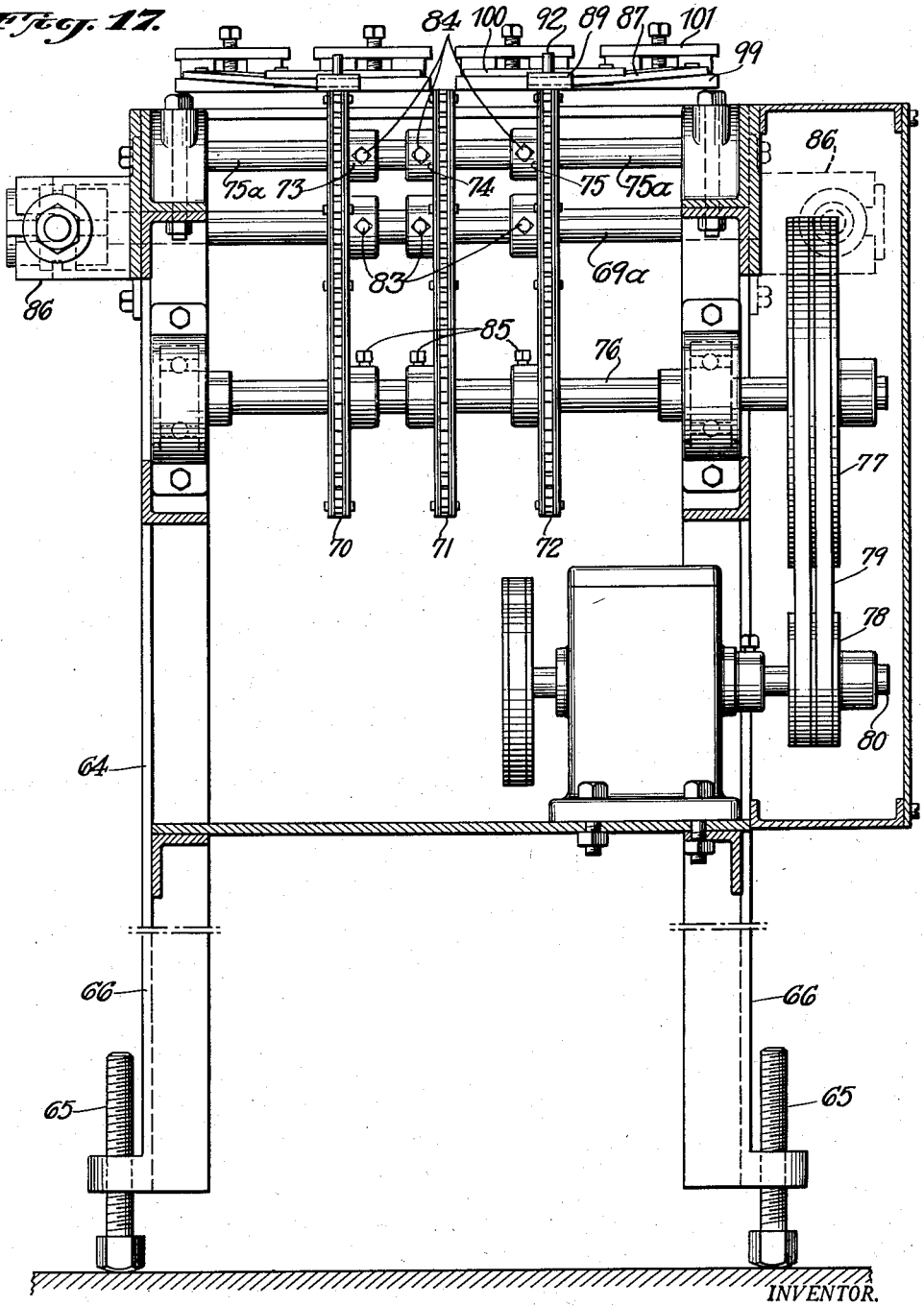

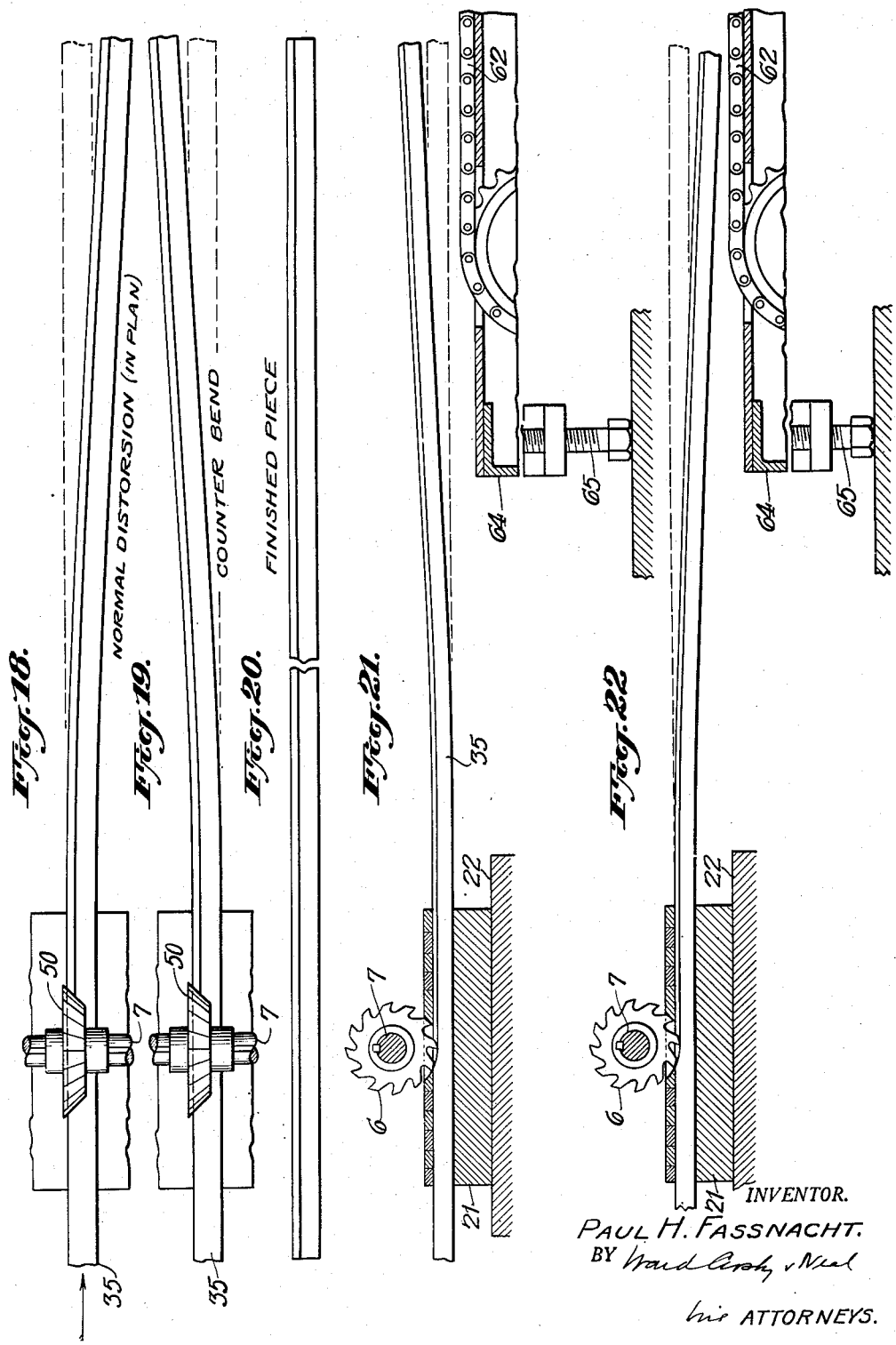

March 2, 1948. P. H. FASSNACHT 2,436,960
APPARATUS FOR MILLING
Filed June 17, 1943 9 Sheets-Sheet 8
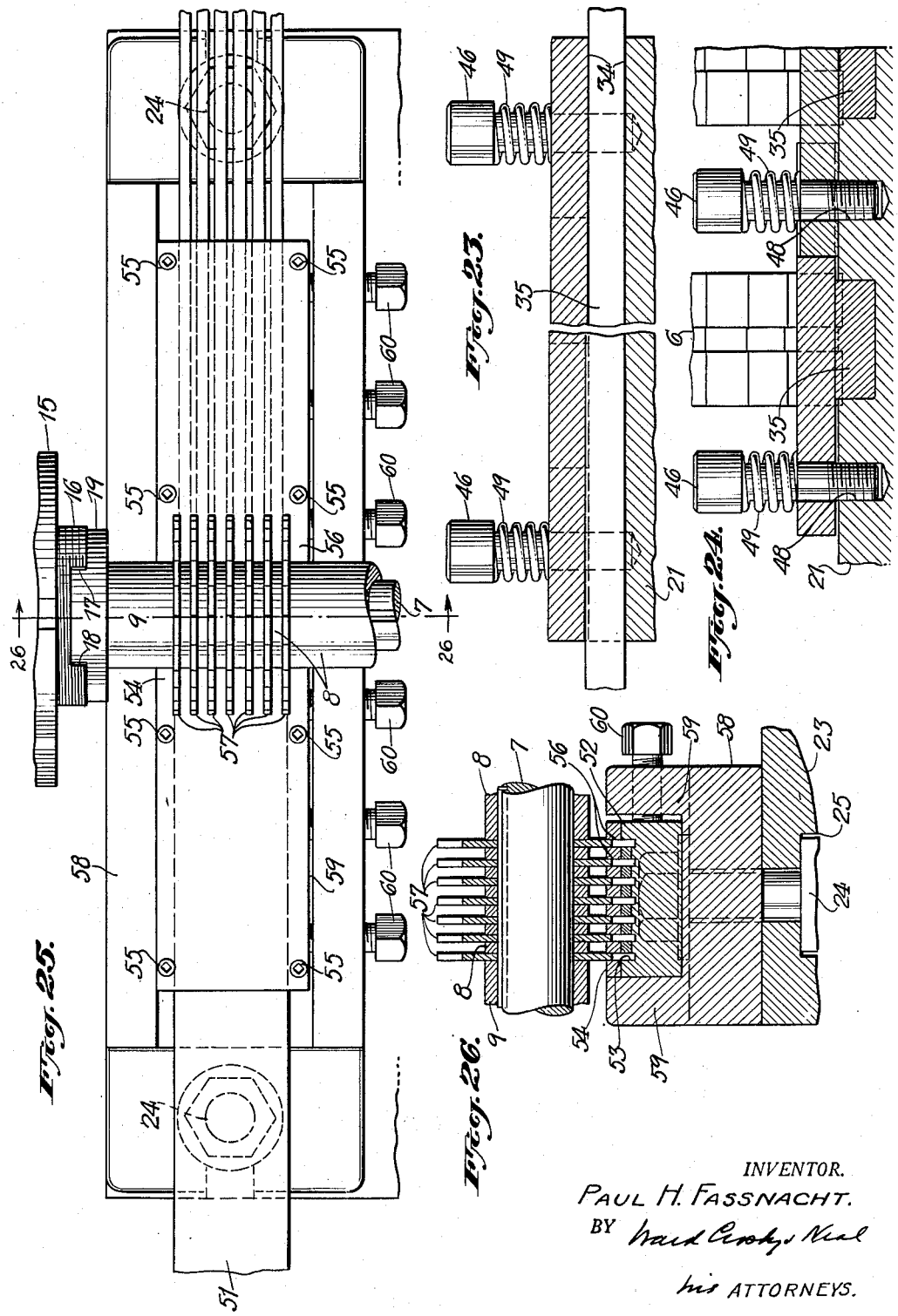
INVENTOR.
PAUL H. FASSNACHT.
BY
his ATTORNEYS.

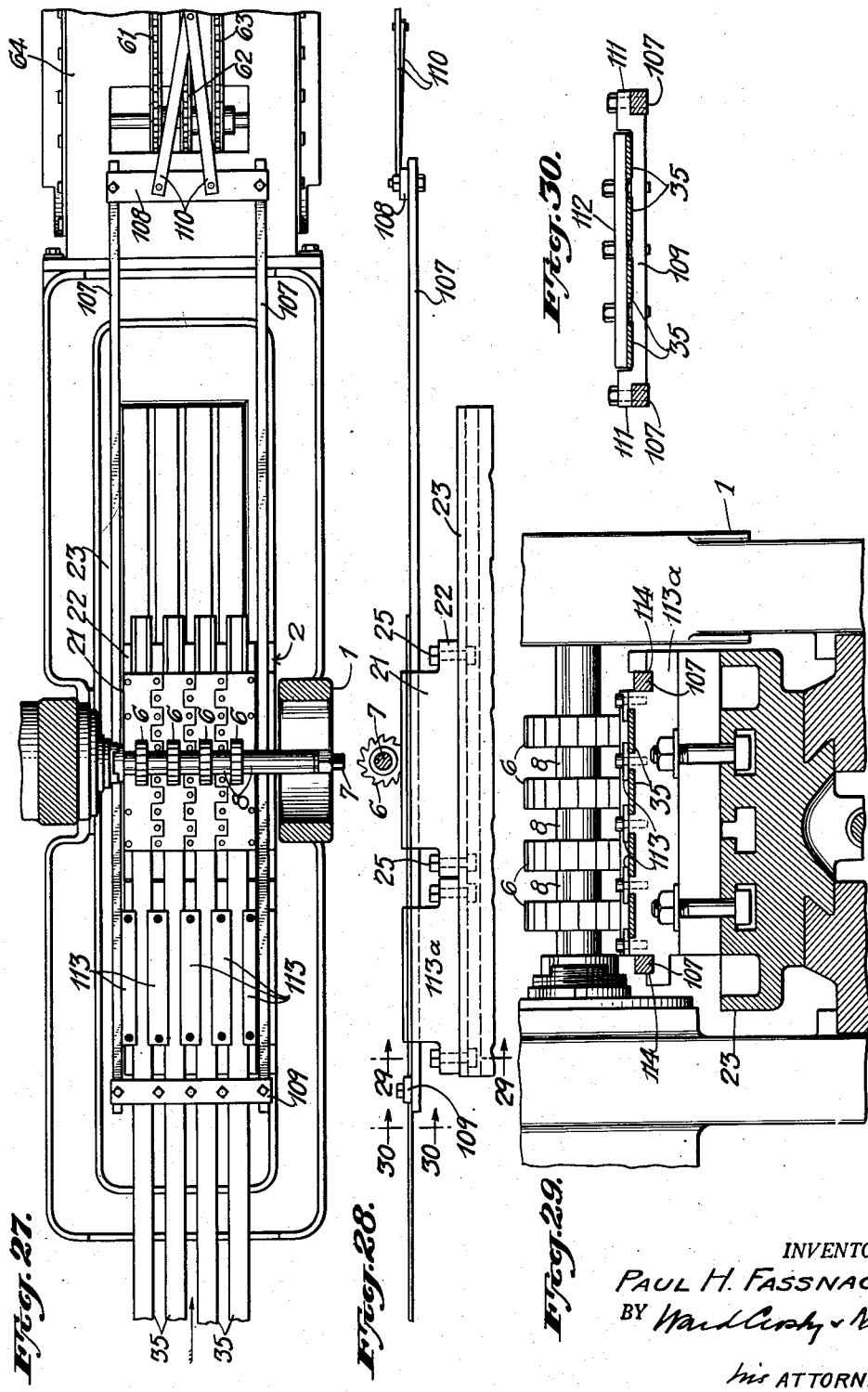

Patented Mar. 2, 1948

2,436,960

UNITED STATES PATENT OFFICE 2,436,960

APPARATUS FOR MILLING

Paul H. Fassnacht, West Nyack, N. Y., assignor to Precision Shapes, Inc., New York, N. Y., a corporation of New York Application June 17, 1943, Serial No. 491,157

11 Claims. (Cl. 90—18)

This invention relates to an apparatus and process for milling and especially the milling of metal shapes, including also the cutting of metal sheets into smaller shapes, particularly where the tolerances in the finished product are small and accordingly the operations are conducted with great precision.

Milling machines heretofore employed, especially where precision milling is required, usually have been conducted on relatively small pieces of work, necessitated by the operation being performed in a reciprocatory manner; that is, the work is usually held on a reciprocating table which is moved back and forth for cutting purposes. No apparatus for precision cutting, especially continuously, of long metal strips has been heretofore devised, so far as I am aware. Operation on short or small pieces of work requires frequent resetting of the work, thus incurring expense in time and labor therefor, as is well known.

I have devised in accordance with my invention an apparatus and method for precision milling or cutting of strips so that this may be conducted without the necessity for constantly resetting the work and accordingly may be conducted continuously on long strips of material.

The principal object of the invention accordingly is to provide a simple efficient apparatus and process for milling long strips of metal so that, if desired, this may be done continuously and extremely low tolerances may be secured in the resulting product.

The invention accordingly comprises in an apparatus for milling, a milling cutter, means for supporting and guiding a strip to be cut thereby, and means arranged for attachment to said strip for moving it through said support past said cutter to cut said strip.

In accordance with my invention, the metal or other material in the form of flat or otherwise shaped strips to be cut, are clamped at or near their ends and drawn through a support enclosing and grasping the surfaces of the metal to be cut under tension. In the case of flat, rectangular strips, the top, bottom and two sides are usually grasped and held under tension. While being drawn through the support, they are cut by cutting devices engaging them through orifices in the support and while the strips are traveling past the orifices and cutters.

In the accompanying drawings, there is shown an apparatus constructed in accordance with the manner in which I now prefer to practice the invention. In these drawings:

Fig. 1 is a side elevation of the apparatus with a portion of the chain and support therefor removed to permit the showing of both ends thereof in the same figure;

Fig. 2 is a plan view of part of the apparatus in Fig. 1 and showing one clamping device attached to a chain engaging the ends of three strips and showing three other strips which have been moved past the milling cutters for attachment to a second clamp;

Fig. 3 is a plan view similar to Fig. 2 showing the six strips attached at their ends to two clamps which in turn are attached to two chains;

Fig. 4 is a plan view similar to Fig. 3 showing the second clamp attached to the ends of the three strips and also showing a temporary clamp (shown in elevation on the left of Fig. 1), whereby the six strips are moved through the milling machine up to the time that the second clamp is attached;

Fig. 5 is an enlarged plan view partly broken away showing the left end of the apparatus of Fig. 1;

Fig. 6 is a fragmentary plan view showing a modified form of clamping means with a turnbuckle;

Fig. 7 is a side elevation of the clamping means shown in Fig. 6;

Fig. 8 is an enlarged cross-section taken on the line 8—8 of Fig. 6 showing the attachment of the clamp to the chain of Fig. 6, the same attachment being employed in Fig. 1;

Fig. 10 is an enlarged fragmentary partial section showing the mounting of the milling cutters and jig with strips passing through the jig in contact with the cutters;

Fig. 11 is a side elevation of one of the cutters partly in section on the line 11—11 of Fig. 10;

Fig. 12 is a fragment showing cutters as in Fig. 10 operating to cut parallel grooves in an L-shaped strip.

Fig. 13 is an enlarged fragmentary cross section showing the cutting of three strips;

Fig. 14 shows a fragment with a bevel type of milling cutter operating on strips which are spring-held by the upper plate of the jig;

Fig. 15 is a perspective view showing the jig assembly with one strip clamped therein and partly cut and with another part of the upper plate disassembled;

Fig. 16 is a view of the partially cut strip of Fig. 15;

Fig. 17 is an end elevation with the frame partially broken away taken from the right in Fig. 1;

Fig. 18 is a fragmentary view showing the normal distortion which occurs in cutting one edge of a strip;

Fig. 19 is a view showing the counterbend required to counteract the distortion shown in Fig. 18;

Fig. 20 shows the finished article of Fig. 18 after the normal distortion has been corrected;

Fig. 21 shows the upward distortion due to cutting the upper surface of a strip, and in dotted lines the strip when straight;

Fig. 22 shows the downward pull of the strip by downward adjustment of the chain supporting frame to overcome the upward distortion of Fig. 21;

Fig. 23 is a fragmentary view showing the upper and lower plates of the jig held together by bolts with springs;

Fig. 24 shows a fragment of a jig with strips of varying heights passing therethrough and showing the action of the spring-held bolts to compensate therefor;

Fig. 25 is a modification showing a plan view of milling cutters mounted to cut narrow strips and with a special jig mounted on the bed plate;

Fig. 26 is a cross-section on the line 26—26 of Fig. 25;

Fig. 27 is a plan view partly in section showing a special clamp passing beneath the cutters and serving to draw the strips to be cut through the jig beneath the cutters at the commencement of the operation;

Fig. 28 is a side elevation corresponding to Fig. 27 but with parts removed;

Fig. 29 is a cross-sectional view taken on the line 29—29 of Fig. 28, and

Fig. 30 is a cross-sectional view taken on the line 30—30 of Fig. 28 showing the strips in section and an end view of the special clamping means.

Figure 9:
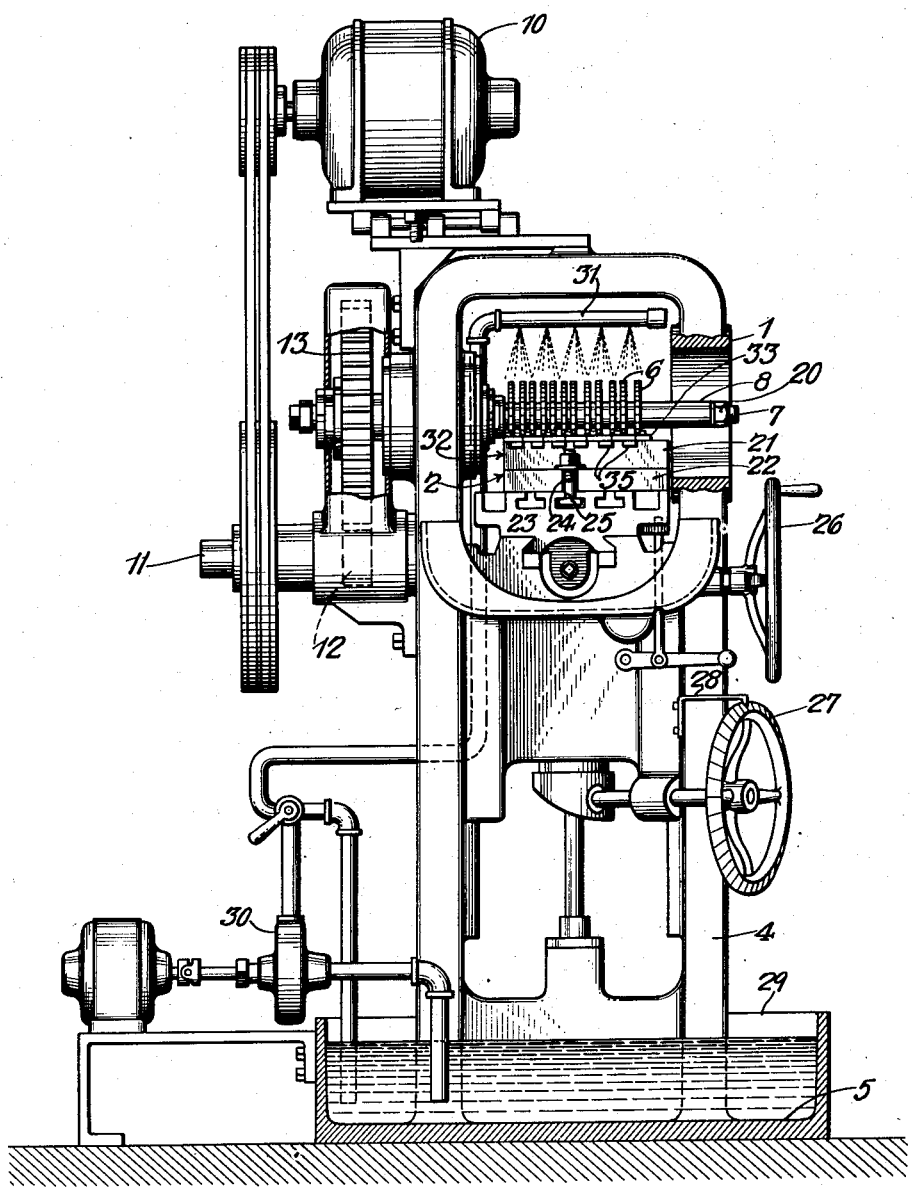
Fig. 9 is an end elevation viewed from the left of Fig. 1 shown partially in section.

Referring now to the drawings and particularly to Fig. 1, the numeral 1 indicates generally the device for operating the cutters; 2 designates generally the devices for supporting and guiding the strip to be cut, and 3 designates generally the device including chains arranged for attachment to the strip or strips for moving it or them linearly through the support past the cutter to cut the strips.

As shown more clearly in Figs. 1, 9 and 10, the cutters are mounted on a pedestal 4 supported by a base 5. The cutters 6 are mounted on a shaft or arbor 7 and are spaced apart by intermediate spacers 8 and an end spacer 9. The shaft is driven by the usual motor drive including a motor 10 mounted on the pedestal 4, driving a shaft 11 on which is mounted a pinion 12 driving the gear 13 which drives the shaft 7. Between the gear 13 and the adjacent spacer 9 is a cover disc 14, which holds the internal bearing parts in proper assembly. The disc 14 is held in place by a nut 15 which is in threaded engagement with an enlarged threaded portion 16 of the shaft 7. The portion 16 is provided with two opposite flattened faces 17, 18 which provide right-angled keyways registering with grooved portion 19 of the spacer 9. The forward face of the spacer 9 accurately defines the plane from which the cutters are spaced at precise distances. This face is arranged in exact vertical alignment with the plane of the left face of the jig as shown in Fig. 10. Once these two planes are in alignment, the cutters are then assembled on the arbor by suitable spacers 8 so that they exactly align with the slots in the jig. The cutters and spacers are then secured in place by the nut 20 on the shaft 7.

The cutters are rotated at speeds varying with the kind of material, type of cutting, etc. I have found that speeds of 70 R. P. M. to over 2000 R. P. M., but without limitation, can be employed. The slower speeds are used for tough steels and other tough materials, while the higher speeds are used for brass and other soft materials.

The work support designated generally as 2 and which will be described below is located directly beneath the cutters 6. It consists as herein shown of a jig or fixture 21 which is mounted on a base 22 attached to a bed 23 by means of a T-headed bolt and nut 24 located and projecting through the slots at either end of the base 22 and with the T-head of the bolt seated in one of the T-shaped recesses 25 in the bed. The bed is adjustable to the right and left longitudinally of the work as shown in Fig. 5 through conventional means operated by the handwheel 26. The bed may be adjusted up and down by conventional means operated by the handwheel 27 which has a graduated periphery with the pointer 28 to indicate the setting.

Coolant is supplied to the work and cutters from a tank 29 located in the base 5 of the apparatus. This is circulated by a motor-driven pump 30 and piping so that it is delivered from a pipe 31 through nozzles situated above the cutters. After spraying onto the cutters and work to control the temperature, the coolant plus particles of cut metal passes back to the tank 29 being filtered enroute.

As shown more clearly in Fig. 15, the jig for supporting and guiding the work includes the base 22 to which is attached the lower plate 32 of the jig and the upper or cover plate 33. The lower plate has a series of six parallel rectangular grooves at the top thereof designated as 34 for guiding and supporting the six strips passing therethrough, here shown as strips of metal 35. The number of strips may be decreased or increased. This metal is guided through the jig past the cutters under tension as described below. The groove 34 has, about midway its length, two opposite arcuate slots 36 in its side walls for receiving the lowermost portions of the cutters 6 when they are operating on the work. The upper plate 33 consists of a series of interlocking segments 37, 38, 39, 40, 41, 42. When these segments are assembled and attached in place, they constitute the cover plate 33 and they cover the lower plate 32 when in position. The segments as shown are provided with apertures or slots 43 which correspond to and are positioned above the slots 36 in the side walls of the grooves. The cutters 6 pass through the slots 43 and 36 into cutting engagement with the metal strips and each cutter substantially closes the corresponding apertures when in operative position. The end segments 37 and 42 each has one edge provided with alternate rectangular recesses 44 and alternate rectangular projections 45. The intermediate segments 38—41 have such alternate recesses and projections on their opposite longitudinal edges, the recess of one edge being opposite the projection on the other edge of each. When the segments are assembled, they interlock as shown, the projections 45 fitting into the recesses 44 throughout. The segments are normally held in place by screw-threaded tap screws 46 passing through apertures 47 in the segments of the cover plate and into tapped holes 48 passing through the upper faces of the walls of the grooves 34. The rows of holes 48 receive, for example, alternately a screw for segment 42, then a screw holding segment 41 and so on, and similarly for the other adjacent segments.

The upper plate when bolted in place on the lower plate normally covers the grooves, as shown, whereby the work 35 closely fits the grooves so that when the work is in place in these grooves and drawn therethrough, it passes through slowly under considerable tension due to the grasping of the strips by the enclosing channel walls formed by the grooves and cover. This means that the upper and lower plates of the jig are selected so that the dimensions of the grooves correspond to that of the work being treated. In Fig. 15, I have shown grooves and work which correspond substantially in all dimensions, but I have devised a means as described below for taking care of work whose dimensions do not correspond with those of the jig (one example of which is shown in Figs. 23 and 24).

Figs. 23 and 24 show screws 46 holding segments of the cover plate resiliently in place by springs 49. As there shown, work 35 has a greater thickness than the depth of the grooves 34. In order to insure proper tension on the work as it is pulled through the grooves under these circumstances, the cover plate, as shown, is held in place by the springs 49 cooperating with the screws 46. The springs should be carefully tested so that they exert approximately the same pressure so that upon assembling the cover segments, they will be held in place to give the desired tension in the work. The desired tension may be determined both with and without the springs empirically as discussed below. In Fig. 23 at the left, the strip 35 is shown as of oversize thickness and prior to being cut, with the spring 49 exerting the proper pressure on one of the cover segments 37—42, while at the right the strip is shown as having been reduced in thickness by cutting so that it is of substantially the same depth as the groove 34. The spring 49 and screw 46 at the right of the figure are holding this cut portion of the strip in place under proper tension. In Fig. 24 on the left is shown a strip of oversize thickness and on the right a strip of substantially the same thickness as the groove, passing through the jig simultaneously and both held in place by the tension of the springs 49 cooperating with screws 46. In other words, some or all of the strips passing through may be oversize but are properly held by the springs 49 and tap screws 46.

The strips may be cut in practically any desired manner. Different types of cutting are shown in the drawings. For example, in Figs. 10 and 13, the strip is being reduced in width by the cutters 6 by cutting portions from each longitudinal edge of the strip. The result of such cutting is shown in Figs. 15 and 16. In Fig. 16 the work 35 has been removed from the jig. The right end of the work is of narrower dimension than the left end and in the center is an arc-shaped cut showing the path made by the milling cutters 6 in removing the longitudinal edges of the strip. In Fig. 12, an L-shaped strip is passing through the groove 34 and the cutters 6 are cutting two parallel grooves in the upper face of the base member of the L. In Fig. 14, bevel cutters 50 are shown cutting a beveled edge on the strip 35. In Fig. 24, cutters 6 are shown forming a central rib on the upper face of the strip 35.

I may also cut a broad strip such as is shown at 51 in Figs. 25 and 26 into a series of narrow strips. For this purpose, I prefer to provide a somewhat different type of jig and cutter, as shown in Figs. 25 and 26. The metal strip 51 passes through a jig which consists of a long narrow lower plate 52 having a groove 53 which is of substantially the same dimensions with respect to width and thickness as the strip to be cut. Over this lower plate is a cover plate 54 which is preferably made in one piece and attached to the lower plate by screws 55. Approximately in the center it is grooved as at 56 to receive a series of milling cutters 57 keyed to the shaft 7. The jig is mounted on a base 58 being seated in a rectangular jaw 59 in the upper face thereof and held in place by a series of screw-threaded bolts 60. The base 58 is in turn held in place by the T-bolt 24 seated in one of the T-slots 25. As indicated in Fig. 10, there is space for three or these narrow base and jig assemblies to be mounted on the bed 23.

The adjustment of the strip 51 can be made as heretofore indicated and when properly positioned, the strip 51 may be cut into a series of smaller strips, shown in Fig. 25 as being cut into six smaller strips.

As above stated, on the right in Fig. 1, 3 designates the means arranged for attachment to the strip 35 for moving it through the jig 17 past the cutters 6 to cut this strip. This includes one or more, here shown as three, endless chains designated by the numerals 61, 62 and 63. These chains are supported by a framework 64 being bolted to the end of the table supporting the bed on which the jig is mounted. The framework 64 is vertically adjustable by means of screw-threaded bolts 65 passing through flanges in upright legs 66. The heads of the bolts 65 are in contact with the floor and the framework 64 may be raised or lowered by the rotation of these bolts. At the end of the frame, near the milling cutters, the chains pass over three idler sprockets 67, 68 and 69 mounted on shaft 69a. At the opposite end of the frame therefrom are mounted three driving sprockets designated as 70, 71 and 72, the chains passing over three idler sprockets 73, 74 and 75, mounted on shaft 75a, above and in line with the sprockets 70, 71 and 72. The drive sprockets 70, 71 and 72 are mounted on a shaft 76 passing through bearings attached to the uprights 66 of the frame. The shaft 76 is driven through pulleys 77 and 78 operated by belt 79 passing thereover. Pulley 78 is mounted on a shaft 80 and is driven by an electric motor 81 provided with a conventional speed-changing device designated generally by 82 for accurately regulating the speed of the drive sprockets 70, 71 and 72 and the chains driven thereby. The sprockets 67 to 75, inclusive, are mounted for lateral adjustment on their respective shafts by set screws. Set screws 83 hold sprockets 67 to 69 in place. Set screws 84 hold sprockets 73 to 75 and set screws 85 hold sprockets 70 to 72 in place. At the end of the chain adjacent the milling cutters is a conventional takeup device designated as 86 for taking up slack in the chain.

One or more of the chains 61, 62 and 63 are provided with clamping members, one end of which is arranged to be detachably held by the chain links and the other end being attached to one or more of the metal strips 35. As shown more particularly in Figs. 1–4 and 8, each clamping member consists of a clamp bar 87 pivotally attached at 88 to a plate 89. Through apertures 90 in the plate, two pins 91 and 92 pass. These pins project downwardly and set against adjacent chain studs 93 and 94 of the chain 63. For this purpose, each of the chains have rounded seats 95 and 96, respectively, for engaging the bars 93 and 94. The edges of the pins opposite the rounded seats are beveled, as shown at 97 and 98, respectively, for pins 91 and 92, which bevel permits the pins to ride into the spaces between the sprocket teeth of the sprocket 73 when the clamp reaches that point. Thereafter, as the pins ride around with the sprocket, they are pushed upwardly and disengaged from the studs of the chain so that the clamp is no longer moved by the chain. At its opposite end from the pin 88, the clamping bar 87 is pinned to the lower plate 99 of the strip-attaching device. The bar 87 is braced by a second bar 100 pinned near the opposite edge of the lower plate 99. As shown in Figs. 2 and 3, two upper plates 101 and 102 clamp three of the strips 35 in place against the lower plate 99 being releasably held by screw-threaded bolts 103 and 104. As shown in Fig. 3, two clamping members are shown each engaging three metal strips. Each of them are identical in construction and the description just given for one will suffice for both.

As shown in Figs. 6 and 7, in order to permit the tension to be adjusted between the pins 91 and 92 which are in contact with the lengths of the chain and the lower plate 99 and clamping plates 101 and 102 which hold the strips at the other end of the clamping member, a turnbuckle 105 forming part of the clamping-bar may be provided operating in the usual manner to tighten or loosen the tension in the clamping-bar 87.

The speed of the chains will vary in accordance with the kind of material to be cut, the shape and finish desired, etc. I have found that the speed of the chain for tough materials where considerable metal is removed may be as slow as two feet per hour. With different material to be cut and smaller quantities removed, the speeds will vary up to 80 feet and more per hour.

In Figs. 18–22, inclusive, are shown examples of distortion due to the cutting operation and the manner of correcting it. Specifically, in Fig. 18 a cutter 50 is shown removing a shoulder from one edge of the flat strip 35. Such removal will produce a tendency for the strip to curve as it leaves the cutter, due to the breaking up of the surface of the strip at the shoulder. This tendency results in the normal distortion shown in this figure in plan. In order to correct this distortion, the strip is bent in the opposite direction in an amount to compensate for the distortion, as shown in Fig. 19, so that the finished piece emerges as shown in Fig. 20. This bending is accomplished by adjusting the travel of the chain to give the counter-bend shown in Fig. 19. Thus, Fig. 3 shows chain 63 pulling three strips past the milling cutters but without lateral adjustment for compensation. In order to produce a counter-bend to compensate for the distortion, the sprockets 67, 70 and 73 would be set over to the left (in Fig. 17) a sufficient distance to give this counter-bend. Similarly, lateral counter-bends could be provided in the other chains 61 and 62 by adjustment of the sprockets 68, 71 and 74 and 69, 72 and 75 over which they pass.

Figs. 21 and 22 show a similar compensation due to removal of metal from the upper surface of the strips. Due to the braking up of this surface, the tendency of the strip is to bend up. This is compensated for by bending the strip downwardly. Fig. 21 shows the distortion upwardly and Fig. 22 shows the counter-bend which is accomplished by lowering the frame 64 by means of the adjusting screws 65, thus lowering the whole chain support.

The apparatus as above described is capable of operating on various kinds of metals, including ordinary steels, alloy steels, grass, and other materials having varying degrees of hardness and otherwise more or less difficult to cut. The speed at which the cutting can be performed will depend on various factors, including the toughness of the material, the amount of cutting to be done, etc. The cutting can be carried on with great precision, if desired, producing products that are cut to dimensions having tolerances of .005" to .001" or less. The speed with which the material is cut efficiently can be determined empirically. One method of accomplishing this, for instance, is to pull the strips under the cutters with the cover plate segments of the jig adjusted to a certain tension and with the speed of the chains 61, 62 and 63 adjusted by means of the variable speed device 82. The dimensions of the cut material are then carefully calipered at various points along the cut strip to determine whether the dimensions are within the required tolerances. If not, the speed of the chains is adjusted so that the cutting is performed to give the desired tolerances. These adjustments can be readily determined after a few trials by a skilled operator. Once the adjustments have been determined for a given size and kind of material passing through the apparatus, a record can be kept of this so that the proper adjustment can be immediately set when such material is again worked upon.

The operation of the machine will be clear from the foregoing description. In practice, assuming that strips are to be cut in the manner shown in Figs. 15 and 16, also assuming that the strips are of substantially uniform size and that they correspond substantially to the dimensions of the grooves made by the upper plate 33 and lower plate 32, at the start of the operation, cutters 6 are mounted on the shaft 7 in the position shown in Fig. 10. The mounting of the cutters is such that the cutter on the extreme left of the figure is spaced an exact distance from the member 9 by an intermediate spacer 8. Another intermediate spacer 8 is then placed on the other side of the cutter 6. The next cutter 6 is then placed on the shaft 7 and the cutters and spacers are thus assembled and located in place by the nut 20.

The jig is then assembled with the upper and lower plates bolted in place and is placed on the bed 23 and is fixed in position. The right edge of the first spacer 9 is so arranged that it is in line with the left edge of the jig. With the parts so positioned, the cutters 6 will be in proper position to cut the work passing through the groove 34.

A metal leader strip 35a (see Fig. 15) may then be run through one of the grooves 34, being of a dimension so that it will not be cut as it passes through the groove. The end of this leader strip will be clamped between the clamp members 99, 101 and 102. The pins 91 and 92 on the plate 89 are then brought into engagement with the appropriate chain studs. The opposite end of the leader 35a is then attached by means of a cross clamp 106 to two adjacent metal strips to be cut. The motor 10 operating the milling cutters is then started, as well as the pump 30 for pumping the coolant through the sprays 31. Thereupon the motor 81 is started to advance the chain and the speed of the chain is adjusted for the particular material as indicated above. The lead strip pulls the strips attached thereto by the clamp 106 through the jig under the cutters and the cutting operation is performed on the metal strips. When the two metal strips have emerged on the opposite side of the jig from the clamp 106, they will be attached to a second clamp member on the chain 63 so that they will be pulled directly by this clamp member thereafter. Thereupon the two last-mentioned strips may be clamped to other metal strips to be advanced through the jig by means of the cross clamp 106, and these metal strips may then be forced through the jig for cutting in the manner just described. When these additional metal strips have passed through the jig, they may be clamped by one of the clamping members 87 and pinned to one of the chains 61—63 to be moved along thereafter by such chain. The cross clamp 106 is, of course, removed to permit the strips to be drawn through the jig when thus clamped. After the first set of strips has been cut throughout the length of said strips, they may be replaced by another set. This last-named set is attached by the cross clamp 106 to a strip or strips which are passing through the jig in process of being cut and whose cutting has not yet been completed. Upon being fastened to such strip or strips, the new strips will be forced through the jig and cut and clamped on the opposite side to one of the clamps 87. Thereupon the drawing and cutting of these strips will proceed as heretofore indicated. Thus continuous sets of strips may be run through the apparatus without any substantial stoppage in its operation.

Instead of using a lead strip 35a as above indicated, I may employ a clamping means which extends from the right of the machine as shown in Fig. 1 to the left of the machine, to clamp strips of metal or other material to be cut and which upon being attached thereto, will pull such material through the jig and cut it without the use of the lead strip mentioned. Such means is illustrated in Figs. 27 to 30. Referring to Fig. 27, there is shown a view similar to Fig. 5 except that there is shown a special clamp for drawing the metal strips initially beneath the cutters in starting the operation of the machine, four strips being shown as moving through the machine instead of six as in Fig. 5. The number of strips operated upon as shown in the drawings may be varied in accordance with the dimensions and other characteristics of the apparatus. The special clamp as shown consists of longitudinal members 107 and end members 108 and 109. Members 107, 108 and 109 constitute a substantially rectangular frame. The forward end member 108 has attached thereto clamp bars 110 by which it is in turn connected to the chain 62. The rear bar 109 is in the form of a shallow U, the side arms of the U being flattened into flanges 111 which are bolted to the longitudinal bars 107. The strips of metal 35 are spaced apart as shown and rest in the depression of the U-shaped bar 109, being clamped by the clamp plate 112, through bolts whose shanks pass between the strips as shown in Fig. 30 and are secured to the U-shaped bar 109.

Guide plates 113 are bolted to the support base 113a attached to the bed 23 to the left of the cutters as shown in Fig. 27 and thus hold the strips therebetween as they advance to the fixture 21. As shown particularly in Fig. 29, the longitudinal members 107 slide through and are supported by rectangular guideways 114 provided on base 113a.

In commencing the operation of the machine using this special clamp, the jig and cutters being in place, the strips 35 are secured to the special clamp so that these project beyond the rear member 109 about the distance shown in Fig. 27. Initially, of course, these strips have not yet advanced to the position shown in Fig. 27 and accordingly the clamp member will occupy a position sufficiently to the left in Fig. 27 so that the ends of the strips 35 are ready to be inserted under the pressure plates 113. The clamp bars 110 are then secured to the chain 62. The strips are then advanced beneath the pressure plates 113 by the pull of the chain on the special clamp and advance to the respective channels in the jig. When in position to pass through the jig under the cutters, the top plate of the jig and the pressure bars are suitably adjusted to give the desired tension to the work, the forward movement of the special clamp being stopped if necessary while these adjustments are being made. Thereupon the movement of the clamp by the chain continues and the work is advanced beneath the cutters until it occupies about the position shown in Fig. 27. At this time the projecting cut ends of the strips 35 are ready to be grasped by the usual clamping members shown more particularly in Fig. 1–4 and 8. Prior to attaching these last-mentioned clamping members, the special clamping member is detached and removed. After the metal strips have been cut by the apparatus as above described, these long pieces may be cut transversely into short lengths as required.

It will be understood that various kinds of metal, plastic, fiber and other materials may be cut by this apparatus continuously to extremely small tolerances. I have successfully cut alloy and other steels, brass, Phosphor bronze, aluminum and aluminum alloys such as Duralumin, magnesium alloys, Lucite and other plastic materials, etc. Various types of milling cutters may be employed, some of which are illustrated in the drawings and various shapes of strips may be produced. The jigs will vary in shape and dimensions of grooves according to the type of cutting desired. After a material has been cut on one side, it may be reversed and cut on the opposite side. Other types of clamping members may be employed than those shown for attachment to the chains.

Although I have described a chain and clamping member as a preferred means by which the strips are moved under tension beneath the cutters through the jig, I may employ instead thereof a clamping member or members mounted on a moving device which will move these clamps and the strips attached thereto by means of a screw-threaded feed. Alternatively, these clamping members may be mounted on a hydraulically operated support to move them and the strips in the manner indicated.

What I claim as new and desire to secure by Letters Patent is:

1. In an apparatus for milling, in combination, a cutter, a jig for guiding the work in a path, said jig having an aperture to admit the cutter to the work and said cutter substantially closing the aperture when in operative position, means to advance the work through the jig, said jig including means substantially enclosing the work on the entrance side of said path with respect to the cutter and gripping the work under tension at the cutter.

2. In an apparatus for milling, in combination, a cutter, a jig for guiding the work in a path, said jig having an aperture to admit the cutter to the work and said cutter substantially closing the aperture when in operative position, means to advance the work through the jig, said jig including means substantially enclosing the work on both sides of said path with respect to the cutter and gripping the work under tension at the cutter.

3. In an apparatus for milling, in combination, a cutter, a jig for guiding the work in a path, said jig having an aperture to admit the cutter to the work and said cutter substantially closing the aperture when in operative position, means to pull the work through the jig, said jig including means substantially enclosing the work on the entrance side of said path to the cutter and gripping the work under tension at the cutter.

4. In an apparatus for milling, in combination, a series of aligned cutters, a jig for guiding work pieces in paths toward said cutters having apertures to admit the cutters to the work pieces, each of said cutters substantially closing its respective aperture when in operative position, means to advance the work pieces through the jig, said jig including means substantially enclosing the work pieces on the entrance sides of said paths to the cutters and gripping the work pieces under tension at the cutters.

5. In an apparatus for milling, in combination, a series of milling cuters, a jig for guiding work in paths toward said cutters having apertures to admit the cutters to the work, each of said cutters substantially closing its respective aperture when in operative position, an endless chain, a clamping member having one end attached to said chain and the opposite end to be secured to said work and regulable driving means to drive said chain to pull the work through the jig, said jig including means substantially enclosing the work on the entrance sides of said paths to the cutters and gripping the work pieces under tension at the cutters.

6. In an apparatus for milling, in combination, a milling cutter, means for supporting and guiding work in a path toward said cutter to remove a portion of said work, thereby causing said work to bend, and means for attachment to said work to move it through said support past said cutter to cut said work, and means to adjust the work out of the path to pull the cut work in a direction to remove the bend therein and to straighten the work.

7. In an apparatus for milling, in combination, a milling cutter, means for supporting and guiding a strip along a path in contact with said cutter to remove a portion of said strip, thereby causing said strip to bend, an endless chain belt having a clamp for attachment to said strip for moving it through said support past said cutter to cut said strip, and a sprocket over which said belt passes, means to adjust said sprocket to move said strip out of its path to compensate the bend in the cut strip and to straighten it.

8. In an apparatus for milling, in combination, a milling cutter, means for supporting and guiding a strip in a path in contact with said cutter to remove a portion of said strip, thereby causing said strip to bend, an endless chain belt having a clamp for attachment to said strip for moving it through said support past said cutter to cut said strip, a frame for supporting said chain belt and driving means therefor, and means to adjust said frame to move the strip out of its path, to compensate the bend in the cut strip and to straighten it.

9. In an apparatus for milling, in combination, milling cutters, a jig for supporting and guiding work pieces to be cut therebeneath, a clamp for attachment to at least one of said work pieces after a portion of it has been cut, and a second clamp to be attached to a second work piece and to said first-mentioned work piece at a position in advance of the point where the first work piece is to be cut, and means for moving the first-mentioned clamp and thereby the two work pieces through said jig.

10. In an apparatus for milling, in combination, milling cutters, a jig for supporting and guiding a work piece to be cut therebeneath, a frame slidably supported by said jig having a clamp at one end arranged to secure said work piece so that its end projects beyond said clamp toward said cutters and means for moving said clamp thereby to move a plurality of work pieces into said jig beneath said cutters.

11. In an apparatus for milling, in combination, a cutter, a jig for guiding the work in a path, said jig having an aperture to admit the cutter to the work and said cutter substantially closing the aperture when in operative position, means to advance the work through the jig, said jig including means substantially enclosing the work on one side of said path with respect to the cutter and gripping the work under tension at the cutter.

PAUL H. FASSNACHT.

REFERENCES CITED

The following references are of record in the file of this patent:

UNITED STATES PATENTS

| Number | Name | Date |
|---|---|---|
| 574,226 | Smith | Dec. 29, 1896 |
| 718,549 | Van Auken | Jan. 13, 1903 |
| 939,631 | Reynolds | Nov. 9, 1909 |
| 1,141,713 | Johnson | June 1, 1915 |
| 1,366,313 | Erickson | Jan. 18, 1921 |
| 1,368,583 | Thompson | Feb. 15, 1921 |
| 1,646,988 | Berthon | Oct. 25, 1927 |
| 1,804,263 | Mayflower | May 5, 1931 |
| 1,903,829 | Megley | Apr. 18, 1933 |
| 2,000,239 | Linn | May 7, 1935 |
| 2,071,619 | Fiegel | Feb. 23, 1937 |
| 2,252,276 | Steiner et al. | Aug. 12, 1941 |
| 2,256,558 | Harder | Sept. 23, 1941 |
| 2,312,355 | Oberhoffken | Mar. 2, 1943 |
| 2,320,814 | Cudini | June 1, 1943 |
| 2,327,531 | Koch | Aug. 24, 1943 |